United States Patent
Lechuga Andrade et al.

(10) Patent No.: US 9,573,098 B2
(45) Date of Patent: Feb. 21, 2017

(54) FILTER AND METHOD FOR THE DESALINATION OF WATER BY MEANS OF REVERSE OSMOSIS OF THE CENTRIFUGAL TYPE, INVOLVING THE GENERATION OF DEAN VORTICES

(75) Inventors: Jorge Antonion de la Cruz Lechuga Andrade, Yucatan (MX); Joaquim Lloveras Macia, Barcelona (ES)

(73) Assignee: Universidad Autonoma de Yucatan, Merida, Yucatan (MX)

( * ) Notice: Subject to any disclaimer, the term of this patent is extended or adjusted under 35 U.S.C. 154(b) by 497 days.

(21) Appl. No.: 13/984,441

(22) PCT Filed: Feb. 7, 2012

(86) PCT No.: PCT/MX2012/000012
§ 371 (c)(1),
(2), (4) Date: Oct. 10, 2013

(87) PCT Pub. No.: WO2012/108754
PCT Pub. Date: Aug. 16, 2012

(65) Prior Publication Data
US 2014/0021134 A1    Jan. 23, 2014

(30) Foreign Application Priority Data

Feb. 8, 2011  (MX) .................... MX/a/2011/001473

(51) Int. Cl.
*B01D 63/16*  (2006.01)
*C02F 1/38*  (2006.01)
(Continued)

(52) U.S. Cl.
CPC .............. *B01D 63/16* (2013.01); *B01D 61/08* (2013.01); *B01D 63/025* (2013.01); *B01D 69/10* (2013.01);
(Continued)

(58) Field of Classification Search
CPC ......... B01D 63/16; B01D 71/66; B01D 71/56; B01D 71/48; B01D 61/08; B01D 69/12; B01D 69/10; B01D 63/025; B01D 63/10; B01D 63/12; B01D 63/02; B01D 63/04; B01D 63/043; B01D 63/046; B01D 61/025; B01D 61/04; B01D 2311/20; B01D 2311/04; B01D 2311/08; B01D 2311/2649; B01D 2315/02; C02F 1/38; C02F 1/441; C02F 2301/026; C02F 2301/024; C02F 1/76; C02F 1/004; C02F 1/66; C02F 2103/08; C02F 9/00

See application file for complete search history.

(56) References Cited

U.S. PATENT DOCUMENTS 3,396,103 A * 8/1968 Huntington .......... B01D 63/062
                                                     159/28.1
3,400,074 A    9/1968 Grenci
(Continued)

FOREIGN PATENT DOCUMENTS

ES   2299349   5/2008
WO   9836823   8/1998

*Primary Examiner* — David C Mellon
(74) *Attorney, Agent, or Firm* — Boyle Fredrickson, S.C.

(57) ABSTRACT

This invention concerns a method for desalination of sea water and a design and construction of a centrifugal filter for desalination of water. The process uses the filter developed based on reverse osmosis technology as a fundamental component that uses hollow fiber membrane modules arranged in a spiral manner around a central support pipe and distributed in concentric rings around the periphery of the rotating section to favor the formation of Dean vortices. Wherein the membrane is built with a structure of an aromatic polyamide as the first layer, followed by a layer of polyestersulfone and a support layer of polyester; applying (Continued)

the material Kevlar 49 in position 1 and 4 on the aromatic chain structure to increase the structure and resistance of the membrane.

6 Claims, 7 Drawing Sheets

(51) Int. Cl.
    *C02F 1/44*     (2006.01)
    *B01D 61/08*     (2006.01)
    *B01D 63/02*     (2006.01)
    *B01D 69/10*     (2006.01)
    *B01D 69/12*     (2006.01)
    *B01D 71/48*     (2006.01)
    *B01D 71/56*     (2006.01)
    *B01D 71/66*     (2006.01)
    *C02F 103/08*     (2006.01)
    *C02F 1/00*     (2006.01)
    *C02F 1/66*     (2006.01)
    *C02F 1/76*     (2006.01)

(52) U.S. Cl.
    CPC ............... *B01D 69/12* (2013.01); *B01D 71/48* (2013.01); *B01D 71/56* (2013.01); *B01D 71/66* (2013.01); *C02F 1/38* (2013.01); *C02F 1/441* (2013.01); *B01D 2313/04* (2013.01); *B01D 2315/02* (2013.01); *C02F 1/004* (2013.01); *C02F 1/66* (2013.01); *C02F 1/76* (2013.01); *C02F 2103/08* (2013.01); *C02F 2301/024* (2013.01); *C02F 2301/026* (2013.01)

(56) References Cited

U.S. PATENT DOCUMENTS

| | | | |
|---|---|---|---|
| 3,669,879 A | 6/1972 | Berriman | |
| 3,821,108 A * | 6/1974 | Manjikian | B01D 61/08 210/321.63 |
| 3,883,434 A | 5/1975 | Gayler | |
| 4,230,564 A | 10/1980 | Keefer | |
| 4,333,832 A | 6/1982 | Siwecki et al. | |
| 4,341,629 A * | 7/1982 | Uhlinger | B01D 61/12 210/128 |
| 4,886,597 A | 12/1989 | Wild et al. | |
| 5,059,317 A * | 10/1991 | Marius | B01D 61/04 210/202 |
| 5,137,637 A * | 8/1992 | Korin | B01D 63/16 210/321.67 |
| 5,284,584 A * | 2/1994 | Huang | B01D 63/02 156/184 |
| 5,626,758 A * | 5/1997 | Belfort | B01D 63/027 210/321.69 |
| 6,132,613 A | 10/2000 | Hopkin et al. | |
| 6,190,556 B1 * | 2/2001 | Uhlinger | B01D 61/022 210/134 |
| 6,190,558 B1 * | 2/2001 | Robbins | B01D 61/025 210/134 |
| 6,824,679 B1 | 11/2004 | Dzengeleski et al. | |
| 2002/0023865 A1 * | 2/2002 | Northcut | B01D 29/114 210/192 |
| 2003/0102269 A1 * | 6/2003 | Bender | B01D 61/16 210/748.1 |
| 2005/0218062 A1 * | 10/2005 | Forman | B01D 61/08 210/321.68 |

* cited by examiner

FILTER AND METHOD FOR THE DESALINATION OF WATER BY MEANS OF REVERSE OSMOSIS OF THE CENTRIFUGAL TYPE, INVOLVING THE GENERATION OF DEAN VORTICES

TECHNICAL FIELD OF THE INVENTION

This invention concerns the design and construction of a filter for the desalination of water, especially for the desalination of sea water. The filter is based on the technology of reverse osmosis, using hollow fiber membranes, arranged in a specific spatial geometry to favor the formation of Dean vortices.

BACKGROUND OF THE INVENTION

The processes for sea water desalination have been around for many years; however, these processes had very high installation and operating costs and a large consumption of energy. The first desalination plants used evaporative technologies, either Multi-Stage Flash Evaporation (MSF) or Multi-Effect Distillation (MED), Vapor Compression (VC), which represented changes in the physical state, which consume a lot of energy. These plants had an energy consumption of more than 12 kWh per cubic meter of potable water produced.

The alternative for these processes has been the development of reverse osmosis. There have been various technological changes to improve the process of reverse osmosis, initially with the use of membranes of different geometries and materials which improve the process and the design of dual processes, to harness the reject water in order to reduce energy consumption, using turbines, Francis Turbines, Pelton Turbines, and lately, the Pressure Exchanger such that in the HON Plant in the Canary Islands, in Lanzarote Spain, that have achieved energy consumptions of 2.6 kWh per cubic meter of water-product. A very respectable figure for this process.

In 1955, electrodialysis (ED) began to be applied in brackish water. These were conducted in laboratories equipped to quantify the results and make the corrections that were required to continue improving efficiency. ED uses electric power with sufficient pressure to force the passage of water with a high concentration through an ion exchange membrane.

The year 1957 marks a milestone, when a patent was simultaneously requested for a SPS module, by Silver and Frankel. With energy savings and large capacities. The first plant with these conditions was installed in 1960 in Kuwait, which produced 1560 m$^3$/day.

The years 1958-1960 were important for reverse osmosis as Loeb and Sourirajan at the University of California. Los Angeles (UCLA), developed the membrane that became the immediate predecessor of the commercial modules.

In 1970, vapor compression began to be used commercially, with an energy consumption of up to 22 kWh./m$^3$, and in 1978, the first large reverse osmosis plant for sea water desalination was built in Jeddah, Saudi Arabia.

Carl A. Grenci's U.S. Pat. No. 3,400,074 (1968), relates to a process for desalination of water by reverse osmosis using centrifugal force, wherein the water is introduced into a semi-permeable rotating cylindrical membrane so that the pure water passes through the membrane by the action of the centrifugal force.

Ronal Gayler Wantage's U.S. Pat. No. 3,883,434 (May 13, 1975), concerns an apparatus for rotary reverse osmosis, which comprises a diaphragm assembled in a pressure vessel. The assembly is mounted for rotation together with the vessel. During rotation, a high recovery percentage of liquid product is promoted. The flow of the turbine may be operated by feeding or by using the reject fluid.

Bowie G. Keefer's U.S. Pat. No. 4,230,564 (Oct. 20, 1980), concerning an apparatus for reverse osmosis or ultrafiltration, has two rotors turning in the same direction around the central axis, wherein the first rotor rotates at high speed and has a drive which serves the feed pump. The second rotor rotates at low speed and has a pressure vessel with a high selectivity semipermeable membrane with a component of the feed stream. This arrangement reduces the losses caused by friction. Compared with centrifugal machines with stationary covers, the membrane is set up for the action of the centrifugal force.

Thomas L. Siwecki's U.S. Pat. No. 4,333,832 (Jun. 8, 1982) concerns a process wherein the sea water and other solutions are accelerated into a rotating structure and applied to a carbon filter. Desalinated water is removed after passing through a long membrane surface, wherein the membrane arrangement is designed in two levels.

The U.S. Pat. No. 4,886,597 of Peter M. Wild., et. al., (Dec. 12, 1989) relates to centrifugal equipment for reverse osmosis desalination, wherein a feed solution containing sea water is separated into a product comprised of a solution with a reduced salt concentration and a depleted solution with an increased concentration, which includes an evacuation sheath to reduce losses due to wind exposure and energy consumption.

The publication of Francisco Sanchez Sainz's Patent WO 98/36823 (Aug. 27, 1998) refers to a centrifugal reverse osmosis system with an option to recover devices for kinetic energy of the product, the purpose of which is to save energy and reduce the cost of product of reverse osmosis processes wherein from the low pressure fluid feed stream, and through the pressure created by the centrifugal force on the module container of the semi-permeable membrane and through rotation about an axis, a product or permeate stream is obtained, thus evacuating the fluid at low pressure. Optionally, the kinetic energy of the product or permeate can be recovered using a device formed by biading and a transmission, transforming it into mechanical energy, and/or to be recovered in the form of pressure through a device formed by a spiral wrap capable of capturing the rotational flow of the product.

Recently, in 1997, Georges Belfort deepened the above principles for nano filtration and ultrafiltration through a membrane with curvature implemented through research, the arrangement of membranes proposed by Dean in 1927 that allowed the formation of vortices that received the name of Dean vortices. These vortices, present some advantages over those of Taylor USPTO patent, 1997.

The U.S. Pat. No. 6,824,679 of Stephen Dzengeleski, et. al. (Nov. 30, 2004) relates to a separation module with hollow fiber membranes and it provides methods for producing packages of one or more layers of membranes made with spiral hollow fiber, for use in separation modules whose performance can be predicted. These modules are designed to use the benefits of Dean vortices. The invention is directed to packets of multiple coiled hollow fibers for use; separation modules are directly scalable because each layer has a performance which is substantially equivalent to the other layer when subjected to flows with a certain speed such that Dean vortices develop.

The Stephen Dzengeleski patent is very similar to the work presented, since it also explores winding of the hollow fiber membranes to create Dean vortices; up to here, the similarities in terms of the differences, Dzengeleski proposes the use of a pump to print the necessary pressure fluid in order to produce reverse osmosis, while our invention proposes to use centrifugal force to promote the necessary pressure so that the reverse osmosis process occurs, with energy recovery, and strengthening of Dean vortices; one more difference, results from winding of the membranes; Dzengeleski, winds his membranes in layers of three, in our invention, we propose a winding in a quincunx manner (triangular array), which reinforce the set of membranes, for the structure formed.

It is pertinent to comment on patent number: 2299349, of Merce Vives Salvador, granted by the Spanish Office of Patents and Trademarks in 2008. The invention discloses a device for desalination, by centrifugal reverse osmosis, with the rotation of a rotating cylinder, the wall of which, is located within another revolving cylinder. It produces energy savings, although the cost is a little high and it does not have spirally wound membranes, therefore, it does not generate Dean vortices.

The process and equipment designed focus on a significant energy savings, which would permit alternative energies, such as wind, tidal, solar, etc., to be accessed and used to process sea water.

DETAILED DESCRIPTION OF THE INVENTION

Problem

Figure 1:
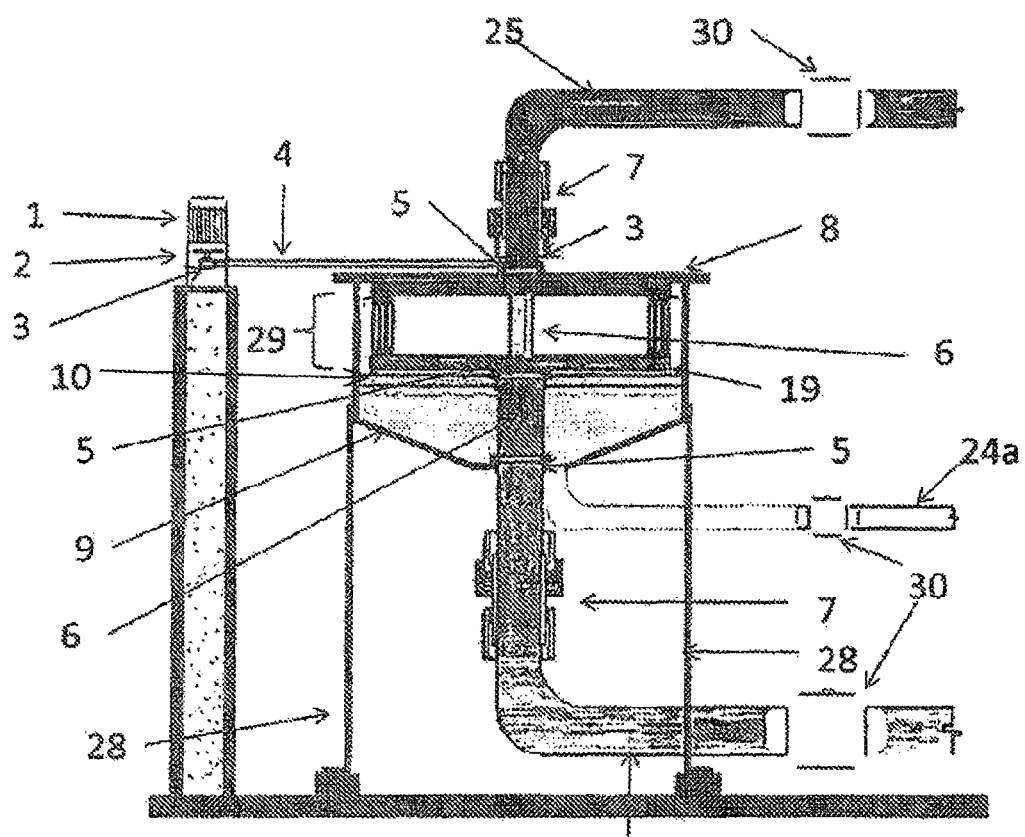
FIG. 1 shows a cutaway cross-sectional view of the reverse osmosis filter.

There is now a growing demand for fresh water and the need for development of a clean technology that can solve the problem of demand without compromising sustainability. To solve these problems, this invention further considers the need to increase the shelf life of the membranes by a process that will enable continuous self-cleaning.

The equipment developed in this invention obtains, through a process of centrifugal reverse osmosis with the generation of Dean vortices, a cost of less than 1.10 USD/m3.

An important factor for the development of this invention is the selection of the membranes to be used in the reverse osmosis filter.

Hollow fiber membranes were selected for this invention because among its noteworthy advantages are the large surface area of the membrane that forms in the compact module; however it is important to mention that these membranes have lower flow compared to flat membranes of the same material.

An asymmetric structure is considered, composed of a layer of micro pore material where the active area of the membrane is found. This is enveloped by another layer of a stronger material with pores of a larger diameter. Basically, the second layer serves to strengthen the first which is usually thinner. The outer wall of the structure does not experience stress due to the passage of the fluid, as it is the inner layer that is in contact with the fluid and which performs the filtering.

Another advantage of the hollow fiber membranes is their limited spectrum, i.e., a distribution of the reduced pore size, which provides higher selectivity when filtering. Hollow fiber membranes are formed by a bundle of millions of capillary pipes with a diameter of a human hair (an interior diameter of from 42 to 72 μm and an external diameter of from 85 to 165 μm) and hollow inside. The first fibers developed of this type were made of cellulose acetate and they produced very little flow. However, it was felt that they could be useful for desalination because they were very inexpensive to manufacture and very thin. Once it was proven that the fiber strength depended principally on the ratio between the external and internal diameter, it was thought that reducing its size would make it possible to obtain an extremely thin wall, which would allow the flow to be increased. This thinness makes packing them into a small space possible, within a cylindrical pipe constituting the protective sheath and allows circulation of the solution to be desalinated. This pipe is made from a high strength plastic material to avoid corrosion. The water to be treated enters into the end of this pipe or sheath and is distributed through a central pipe provided with perforations situated towards the pipe walls.

The fibers are placed in parallel around this central pipe, and are bent into one of the ends and return through the other end, so that the length of each fiber is approximately double the length of the tube. At both ends of the tube the fibers are embedded in a mass of epoxy material, to give them rigidity. Subsequently, one of the ends is cut so that each fiber is open on one side of the tube, at both ends, facilitating the exit of the product, while the other end at which the bent portion is located, is rigidly secured. The resulting assembly is usually called module or permeate, also membrane, and the large amount of fibers it contains gives the assembly great compaction, which helps to resist the pressures applied. Pressurized water is applied to the membrane from the external capillary and the wall of the fiber acts as a sheet or separating membrane that retains salts, while the water product that has gone through the membrane circulates inside. The brine is displaced in a radial manner toward the edges of the pipe being collected by a manifold for its evacuation.

The surface of these membranes is very large as it is constituted by the development of millions of capillary tubes, but when the fiber bundle, which constitutes the membrane, is extended; it establishes a significant flow through the membrane. The thickness of the fiber wall is quite large in relation to its diameter, which allows it to endure the high pressures used.

The hollow membranes of the fiber also offer advantages which favor their use in the centrifugal reverse osmosis processes, which are necessary for the self-cleaning operations.

Similarly, it was found that for the ultra filtration (UF) processes the two referenced types of membranes may be used: spiral and hollow fiber, because both may operate under the conditions required by this process; it is common to encounter both membrane configurations for ultra filtration on the market.

For the processes of reverse osmosis, in the case of centrifugal filtration to generate vortices, the hollow fiber membrane is used, with the "inside-out" flow. The use of composite aromatic polyamide and polyestersulfone plus other materials with a boron retention capacity of up to 94%.

As already mentioned above, for the OI stage spiral membranes are used for the conventional process; but in this invention, hollow fiber membranes were used, to create the required configuration and structure, so that the Dean vortices can be generated.

Different geometries were constructed to evaluate the formation of vortices within them. Of the cases analyzed, the geometry providing the best conditions for the formation of Dean vortices turned out to be a 20 mm passage, a curvature having a diameter of 5 mm, and an internal diameter of 1 mm. Centrifugation positively affects the formation of vortices, increasing the speed and consequently the stress on the wall. To achieve the necessary pressure, a speed of 2000 rpm and a turning radius of 500 mm were required. Other options are a 30 mm diameter passage with a curvature of 10 mm diameter and an internal diameter of 1 mm.

To decrease the drop in pressure across the membranes, they proceeded to roll them up in the direction of the rotor's rotation, which was found to be 519 kPa. The fluid pressure at the exit is 92 kPa. In addition, it was found that the permeate does not affect the formation of vortices.

According to FIG. 1 in the construction of the filter a 2000 RPM, 10 HP motor (1) was used, with a speed regulator (2) and two 3" pulleys (3) with a nominal diameter (76.2 mm), as well as the bands for the transmission (4). Conical load bearings or bushings were used (5) due to its high load resistance at relatively high speeds; additionally three high load bushings (5) were used along the central stainless steel pipes (6) which have a propylene rubber (not shown) hermetic seal, wherein the bushings (5) are suitable for both mechanical radial loads and mechanical axial loads, in compliance with the DIN 616/DIN720 standards.

Kalsi seals (7) were also used in this invention, which are made up of a rotary portion and a fixed portion, which provide hydrodynamic lubrication to minimize wear, retain lubricants and exclude contaminants. The seals were placed on the upper part of the filter (8) wherein the rotary section was situated below and the static section was situated above. The other Kalsi seal (7) was placed in the lower part of the filter (9) wherein the rotary section was located above and the static below. Depending on the diameters of the piping where it was located, the external diameter of the piping is the internal diameter of the seal.

Figure 2:
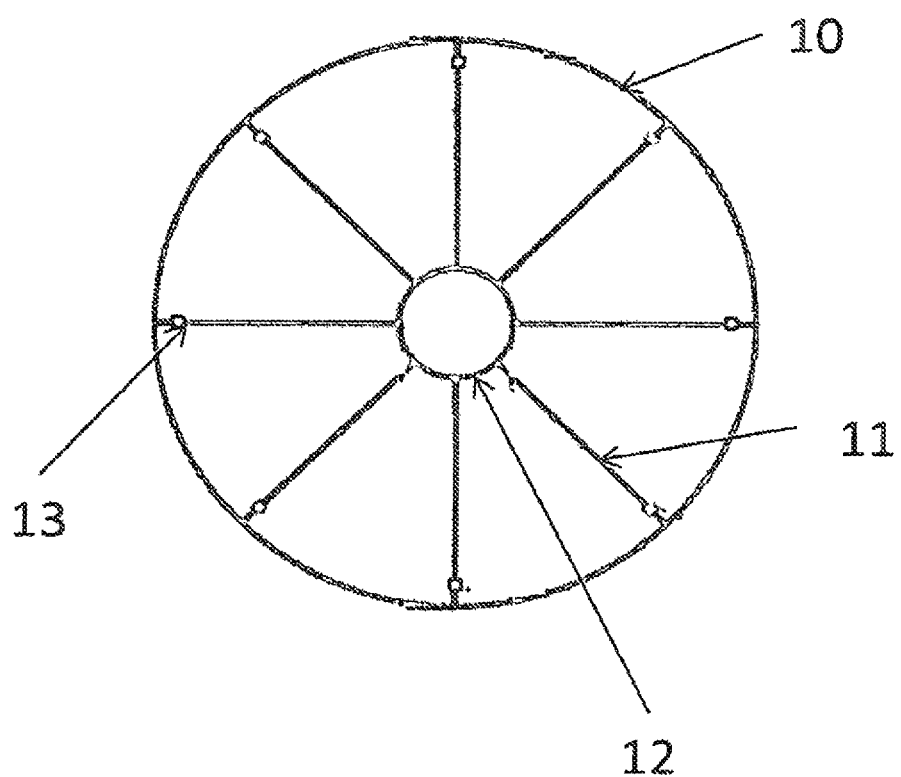
FIG. 2 depicts a supporting disk serving as mechanical reinforcement for load support.

The filter of this invention is subject to the action of centrifugal force, consequently, it requires a solid structure which at the same time makes it possible to have the necessary consistency to prevent that the velocity and the vibrations to which the equipment is subject, do not break the equipment down; for these reasons, a stainless steel disk (FIG. 2) (10) was designed and constructed with AISI 316 stainless steel, composed of eight shafts or spokes (11) that join a central inner circle (12) which is a central housing for a load ball-bearing with its respective cup. On each end of those of the shafts or spokes (11) a spherical ball-bearing (13) is adapted so that the weight of the load rests upon the disk load (10) that supports a tank disk with feed water (19) that contains water to feed the modules (16) which contains the membranes (17).

Figure 3:
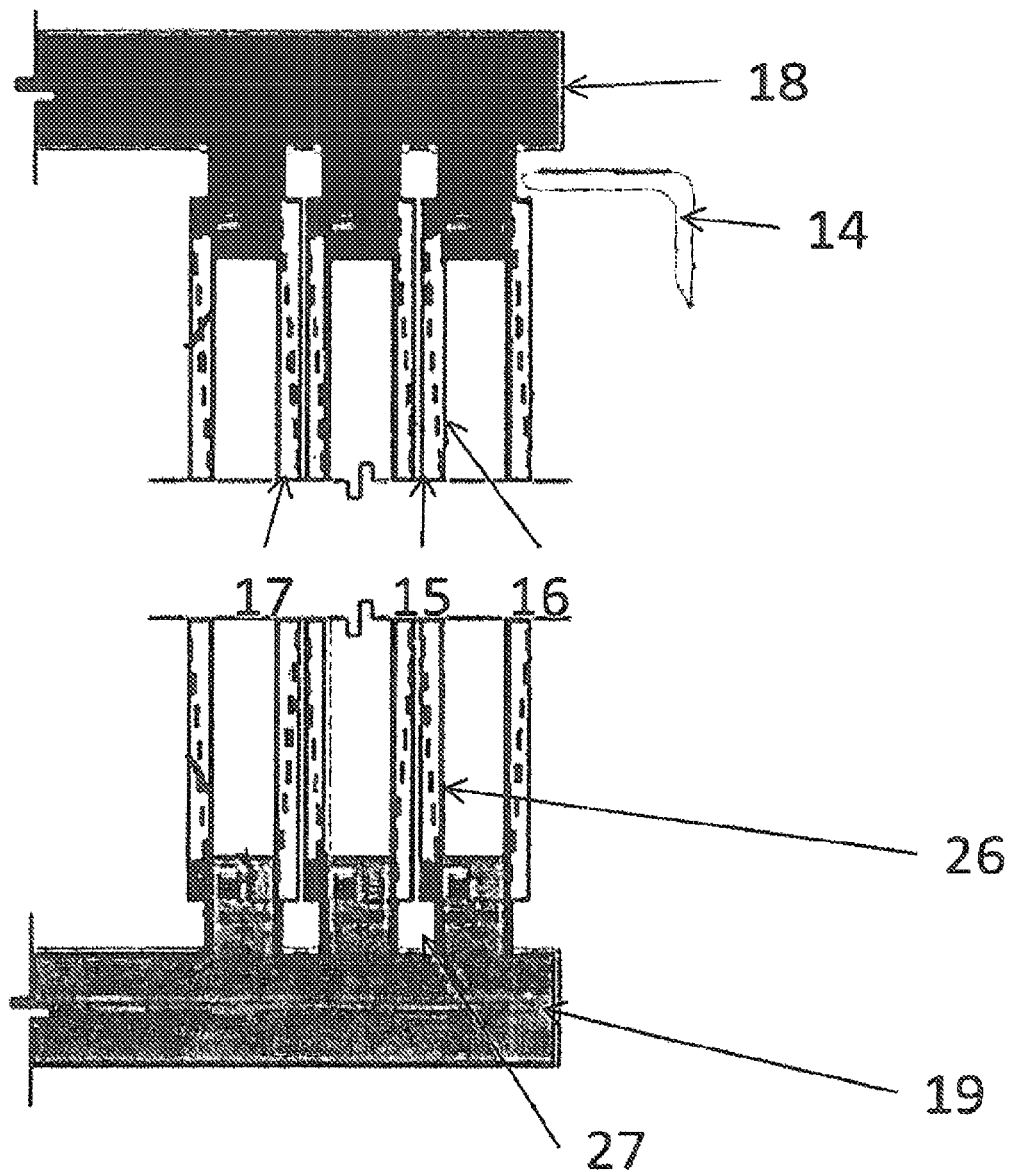
FIG. 3 depicts a cross section of the assembly of the membrane modules, being the top disk tank which receives the reject water from the membranes and the bottom tank disk where the water is distributed to feed the membranes.
Figure 5:
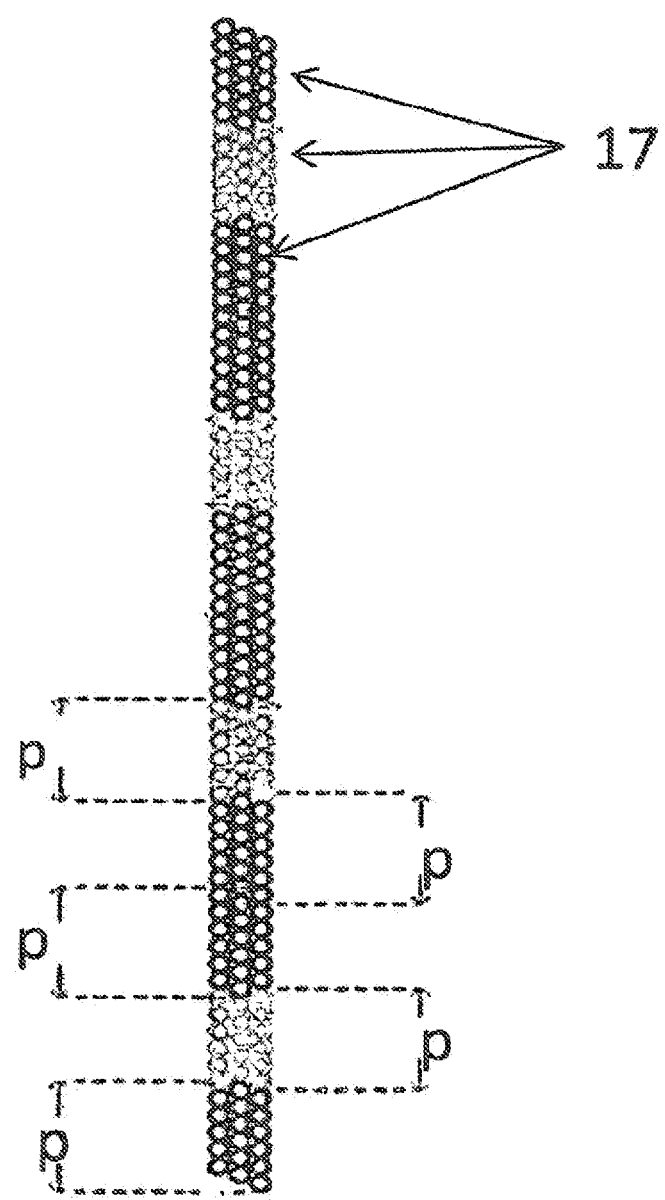
FIG. 5 shows a cross section view of the arrangement of the membranes in the membrane module.

In one embodiment of the invention (FIG. 3), the internal diameter of the membranes used was 1 mm, with a curvature diameter of 5 mm and a pitch size of 20 mm. The membranes (17) were arranged around a pipe (15) FIG. 3, wherein depending upon the dimensions of "p" passage and the diameter of the curvature, up to 34 membranes (17) are able to be rolled up in a quincunx position or triangular arrangement (FIG. 5), wherein the placement of the modules (16) with the membranes (17) are placed in parallel rows, in such a way that each row corresponds to the space between two tubes the pipe of the immediate row [SIC], forming equilateral triangles, wherein by tolerating the mentioned dimensions, two turns per membrane are obtained. In order to better understand, FIG. 5 depicts an idea of the quincunx arrangement with thirty-four membranes (17).

The membranes (17) are rolled up around a pipe or support (15) of Schedule 80 PVC (34 membranes), and three rows were designed placing the pipes in a vertical position in concentric circles between two tank disks (18) and (19) of the filter. The first row (20)—FIG. 4—contains 82 pipes, the second row (21) 88 and the third row (22) 94, that is, a total of 264 pipes and 34 membranes each one; in other words, 8,976 membranes in the filter. The entire assembly is safeguarded by a housing (23) that does not rotate, preferably constructed of stainless steel with a thickness of ¾%, the membrane support rows are presented (94 supports), for the row (22) closest to the AISI 316 stainless steel housing, the $2^{nd}$ row (21), of 88 membrane supports, and the $1^{st}$ row (20) of (82 supports), the one having the smallest diameter was taken as a base for the radius of the centrifugal force calculation, 500 mm; a fundamental part in the simulation that was used to calculate the stress on the wall. The permeated water exits the top of the module assembly (16) through a duct (14) that makes it possible for it to run down the internal wall of the housing (23) towards the bottom of the housing (9).

In the invention presented, rolling up of the membranes is performed in the direction of the rotor's rotation; the water to be treated was fed from top to bottom, Through a feed pipe (24) ensuring that the membranes always contain water; while the reject water is obtained in the upper part of the disk tank filter (18) and is extracted from the system through the piping (25). To ensure that the space between the cylinders always contain fresh water a cylinder (26) is installed that is concentric with the membrane (17) support (15) at a distance of between one or two centimeters, maintaining in this way the differential of concentrations, ensuring in this way the reverse osmosis process, recollecting the permeate water that flows down and is contained in the housing (23) which does not intervene in the rotation, which means energy savings.

The invention required 528 seals (27) for its construction two for each membrane module (16). These seals facilitate the membrane module assembly (16), in the lower part which is adapted to a pressure spring (not shown) as well as the upper part of the membrane module assembly, which is placed under pressure, using the contraction of the lower spring.

Figure 4:
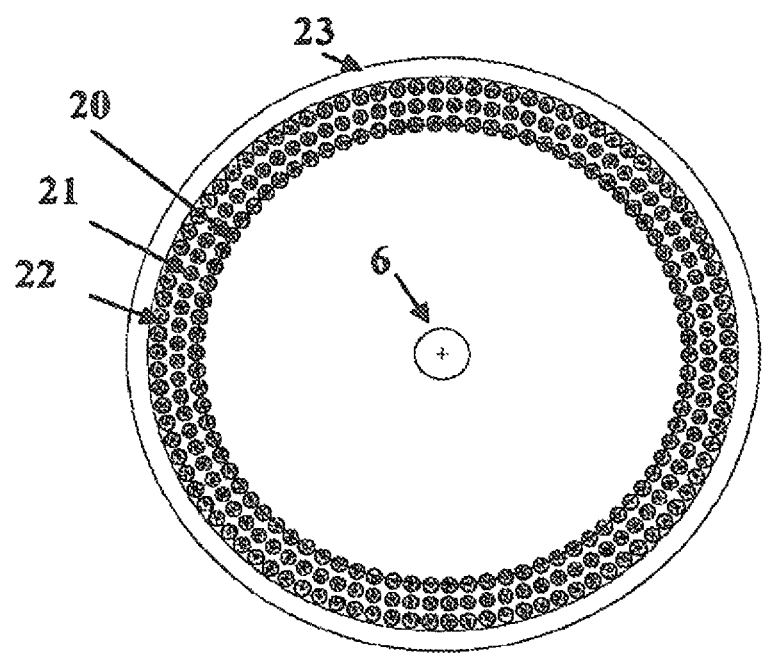
FIG. 4 is a top view which shows the arrangement of the modules containing the membranes.

In FIG. 4 the filter of this invention shows in a horizontal cross section, the membrane modules (16) that make up the three rows of this invention.

The filter housing (23) is supported by four support rods (28) constructed in stainless steel, being this option only a modality to support the filter.

The water enters through the lower part (9) of the filter towards the sea water feed disk (19) and is moved towards the reject water upper disk (18). The lower part of the housing (9) is of an inverted conical form with a truncated tip through which the sea water feed pipe (24) is threaded that connects to the lower tank disk (19) and the permeate discharge water (24a) which is collected in the lower conical section (9) of the housing. In the cylindrical section of the housing (29) the three rows of membrane modules are located (16), 264 in total, with thirty-four membranes (17) rolled into a spiral formation, for each module (16). The mobile internal assembly is supported by the disk with 8 shafts (10). In the upper part, the tank disk (18) is found which contains reject water that exits from the disk through the piping (25), which has a globe valve (30) of the same type as used in the piping (24) and (24a) while in the lower conical section (9) the treated water is collected and sent to post-treatment via the piping 24, which has a control valve.

Figure 6:
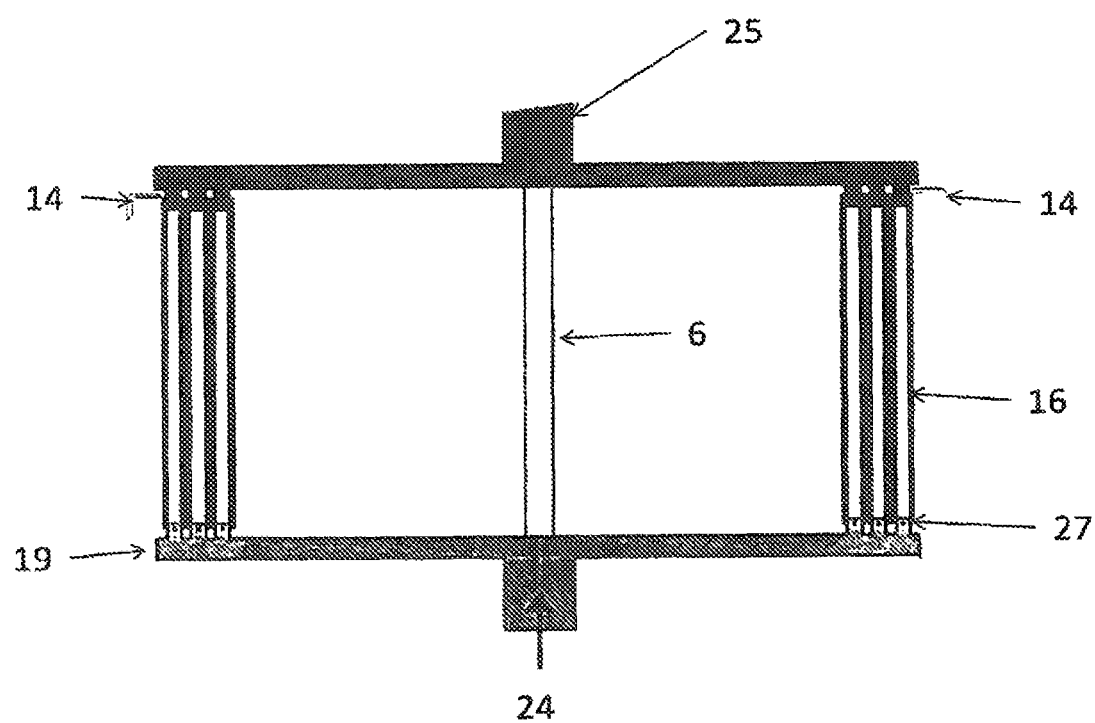
FIG. 6 shows in detail the revolving section of the filter.

FIG. 6 shows in detail the revolving section of the filter (29) fed through the lower piping (24) wherein the membrane modules (16) are arranged in three rows, pressure assembled between the lower tank disks (19) and the upper tank disks (18); wherein the permeate water drains through the duct (14) to be collected in the lower part of the housing (23). In this Figure the central pipe (6) is also shown.

Figure 7:
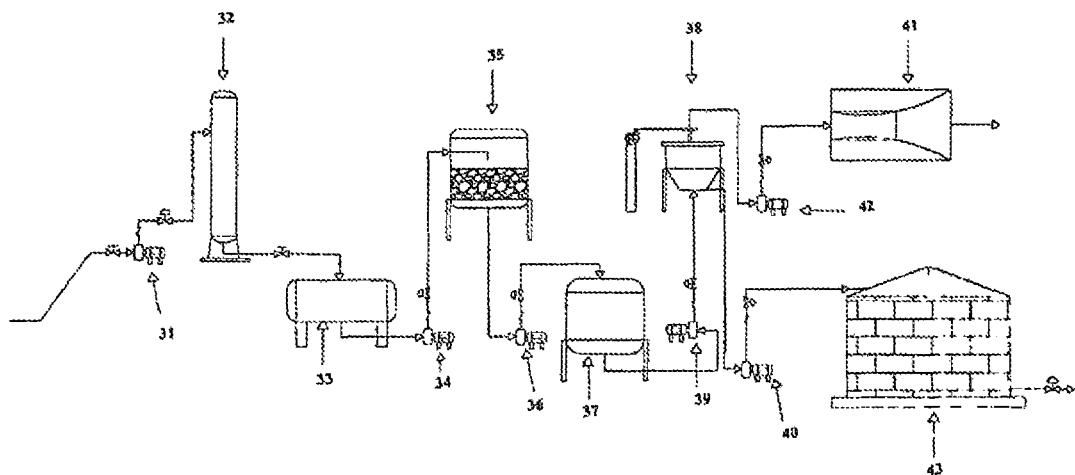
FIG. 7 is a flowchart of the processes for sea water desalination by centrifugal reverse osmosis using the filter of this invention.

Process:

FIG. 7, is a flow diagram of the process which begins with a two HP pump (31), that takes sea water for a distance of one kilometer, and transports it to an elevated tank (32), from there by gravity, the pre-treatment is begun making the water pass through a sand filter (33), to eliminate solids in suspension, with a 0.5 HP pump (34), the water is transported to the cartridge filter (35) and subsequently using the 0.5 HP pump (36), the water is transported to a tank for Equalization (37) where it will be stored. Before transporting the flow to the osmosis filter (38), with the purpose of controlling the amount of water that should be fed to the aforementioned filter (38); using the 0.5 HP pump (39), the filter (38) is fed towards the entry water repository or disk (19); the reject water, exits through the upper part of the filter (18) and with the help of the 0.5 HP pump (42), it is transported to a brine diffuser (41), for possible reuse. The permeate water, exits through the lower part (9) and using the 0.25 HP pump (40), it is moved to a storage tank (43), for post-treatment.

The post-treatment is applied after reverse osmosis filtration, the permeate water, is typically used, calcium hydroxide for pH and calcification control of the water, carbon monoxide for carbonation of the water and the pH regulator and sodium hypochlorite to disinfect.

The pre-treatment also requires from a cleansing or disinfection for whatever it might contain; for that reason, sodium hypochlorite is added to the sea water as a disinfectant, elimination of the organic material andfor biological activity; a coagulant, aluminum sulfate is normally used, for removal of colloids on filtering beds and thus reducing the SDI, sulfuric acid which controls the calcium carbonate precipitates, pH control and a good bactericide and sodium bisulfite, removes residual chlorine.

The substances mentioned are used in small quantities, depending on the water conditions, but the portions are very small.

Manner to Implement this Invention:

In the following section, the calculations for energy consumption are outlined, to obtain energy consumption, in the membranes, pumps and motor for operation of the production system.

First, prior to the calculation of energy consumption, the operations performed to obtain the angular speed in RPM are presented. And then, it was calculated based on the pressure drop across the membranes, to convert them into Kwh.

Calculation of rotor RPM, on the basis of the pressure required for centrifugal reverse osmosis.

The equation (1) is to calculate the angular velocity, and is reached by calculating the following ratio:

$$P_p = \tfrac{1}{2}(\rho_{sw}\omega^2 R^2_{exit}) \text{ (Wild et al, 1997).} \tag{1}$$

Where:

$P_p$ is the applied pressure in Pascals $\rho_{sw}$ is the density of the sea water $R_{exit}$, is the radius of the filter rotation (it is 0.5 m). This is estimated from the center axis to the nearest wall membrane. This is done in order to test whether the force or stress is that required.

$\omega$ is the angular velocity in radians/s

The equation (2) is for the calculation of the pressure $$P = F/A \tag{2}$$

Where:

P, is the pressure applied in Pascals

F, is the force, in Newtons

A, is the area of application of the force. m²

The procedure to calculate the RPMs is the following:

$$P_p = \tfrac{1}{2}(\rho_{sw}\omega^2 r^2)$$

5.5 MPa or 5,500,000 Pascals of pressure is required to obtain reverse osmosis in the membranes.

The mass was calculated based on the densities of the materials, which rotate and the volume of each one.

$$5.5 \text{ MPa} = \tfrac{1}{2}(\rho_{sw}\omega^2 r^2)$$

The density of the sea water has a value of 1027 Kg/m³

The radius of the rotor is 0.5 m 5.5 MPa=128.375 $\omega^2$ 5.5 MPa=128.375 $\omega^2$ Consequently: $\omega\sqrt{=42843.23}=206.9$ radians/s 1 RPM—0.10471 radians/s (X) RPM—207.0 radians/s $$X = \frac{207.00}{0.10471} = 1{,}976.88 \text{ RPM} \cong 2{,}000 \text{ RPM}$$

This is the angular speed in RPM, which produces a pressure of 5.5 MPa.

It uses a speed variator and a set of pulleys, to obtain the 2,000 RPM.

The contact area on the membrane wall for the present embodiment, is: 28.2 m²

That is calculated based on the area of each membrane; 8,976 membranes are 1 mm in diameter, by 1 m in length.

The area of a membrane is equal to the perimeter of the circumference of the membrane by the length.

Perimeter=$\pi \times D$ (diameter of the membrane)

The diameter of the membrane is equal to 1 mm or in other words, 0.001 m

Perimeter of membrane=3.1416×D, 3.1416×0.001 m=0.0031416 m.

Area of the membrane wall=Perimeter×length; 0.0031416 m×1 m=0.0031416 m²

There are 8976 membranes; therefore: 0.0031416 m²×8976=28.2 m². This amount must be adjusted to the active area of the membrane filtration, and to subtract the section of the area of the membrane, which is assembled in the upper and lower fittings of the module, resulting in an effective area of: 27.354 m²

Calculation of the Fall in Pressure in the hollow Fiber Membranes

| With the following membrane measurements, used in the work: | |
|---|---|
| h = height: 1 m | V = volume in m³ |
| d = internal diameter: 0.001 m | r = radius$_{membrane}$ = .0005 in m |
| W = work in Joules | W = PdV |
| P = pressure in Pascales | $V_2$ |
| | dV |
| | $V_1$ |
| | V = π · r² · h |
| | V = (3,1416) · (0.0005)² · (1) = 7.85 × 10⁻⁷ m³ |
| The fall in pressure obtained was: 519 kPa. | W = (519,000 Pascals) · (7.85 × 10⁻⁷ m³) = 0.407415 Joules |
| | 1 Kwh is equivalent to 3,600,000 Joules, |
| therefore: | |
| | How many Kwh are 0.407415 Joules |
| | X = 1.132 × 10⁻⁷ Kwh of energy consumption per fall in membrane pressure. (Crowe, 2006). |

Calculation of the Consumption of Energies by the Pumps and the Motor

Calculation Notes

A. Pumps for the Process

To determine the capacity and potential of the process pumps, the start point was taken from the capacity of the Centrifugal Osmosis rotating filter. The permeate from the osmosis equipment which is 5,8883 m³/h, which is 40%, was converted to GPM to enter into the table on page B14 of CRANE "Flow of Fluids (2009), to select piping diameters and the fluid velocities (water).

To calculate the static charges, the suction and discharge distances to the piping were given in meters.

To calculate the dynamic friction charges, the accessories were selected and quantified that would be had in the suction as well as in the discharge, as well as the value of the length equivalent depending on the nominal diameter and the type of accessory taken from the "Catalogue of References for the Centrifugal Pumps Course" of the VALSI brand.

Subsequently, the algebraic sum of the equivalent lengths of the suction and discharge is calculated including the lengths of the piping, and a correction is made using the values from the Pump Reference Catalog in function of the nominal diameter in inches and the flow in GPM or in LPM to give us the total equivalent length.

Then the static charges from suction and discharge (heights) are algebraically added together and the dynamic friction load through the pipe and fittings to obtain the total load for the pump in meters.

Lastly, the power required by the pump is calculated by multiplying the total charge by the volumetric flow divided by the conversion factor and efficiency of the pump.

1. PUMP (31) "Suction of Sea water to the Elevated Tank.

| | |
|---|---|
| Nominal diameter of the piping | 4" (101.6 mm) |
| Horizontal length of piping | 250.00 m |
| Vertical length of piping | 6.00 m |
| Total length of piping | 256.00 m |
| Leq. of the Suction filter | 20.20 m |
| Leq. of the Elbows (4) 4 × 1.2 | 4.8 m |
| Leq. of No Return Valve | 11.5 m |
| Leq. of the Globe Valve | 36.5 m |
| Leq. of Increase | 0.28 m |
| Losses due to Friction | 329.66 m |
| Total Length Equivalent | |
| Total Leq. = 329.56 × 1.22/100 | 4.02 m |
| Total Load = 4.02 + 6 | 10.02 m |
| Volumetric Flow | 22,007 m³/h |
| | 6.11 l/s |
| Pump Efficiency | 0.85 |
| Conversion Factor | 76 kg-m/HP |
| Power of Pump = Ht × Q/76 × 0.85 | |
| HPb = 21.14 m × 6.11 l/s/76 × 0.85 = | 2.0 HP |
| Electric Motor with FS of 1.2 | 2.4 HP |

2. PUMP (34) "from the Sand Filter to the Cartridge Filter.

| | |
|---|---|
| Nominal diameter of the piping | 3" (76.2 mm) |
| Horizontal length of piping | 7.00 m |
| Vertical length of piping | 2.00 m |
| Total length of piping | 9.00 m |
| Leq. of the Elbows (4) 4 × 1.90 | 4.0 m |
| Leq. of No Return Valve | 8.2 m |
| Leq. of the Globe Valve | 28.6 m |
| Leq. of Increase | 0.2 m |
| Leq. of Reduction | 0.26 m |
| Losses due to Friction | 50.26 m |
| Total Length Equivalent | |
| Total Leq. = 50.26 × 3.64/100 | 1,829 m |
| Total Load = 1,829 + 2 | 3.83 m |
| Volumetric Flow | 19.15 m³/hl/s |
| | 5,321 l/s |
| Pump Efficiency | 0.85 |
| Conversion Factor | 76 kg-m/HP |
| Power of Pump = Ht × Q/76 × 0.85 | |
| HPb = 3.83 m × 5.321 m3/h/76 × 0.85 = | 0.32 |
| Electric Motor with FS of 1.2 | 0.5 HP |

3. PUMP (36) "from the Cartridge to the Equalization Tank.

| | |
|---|---|
| Nominal diameter of the piping | 3" (76.2 mm) |
| Horizontal length of piping | 10.00 m |
| Vertical length of piping | 2.00 m |
| Total length of piping | 12.00 m |
| Leq. of the Elbows (4) 4 × 1.0 | 4.0 m |
| Leq. of No Return Valve | 8.2 m |
| Leq. of the Globe Valve | 24.0 m |
| Leq. of Increase | 0.2 m |
| Leq. of Reduction | 0.26 m |
| Losses due to Friction | 48.66 m |
| Total Length Equivalent | |
| Total Leq. = 48.66 × 6.16/100 | 3.0 m |
| Total Load = 3.0 + 2 | 5.0 m |
| Volumetric Flow | 14,7204 m³/h |
| | 4,089 l/s |
| Pump Efficiency | 0.85 |
| Conversion Factor | 76 kg-m/HP |
| Power of Pump = Ht × Q/76 × 0.85 | |
| HPb = 5.0 m × 4,089 l/s/76 × 0.85 = | 0.32 HP |
| Electric Motor with FS of 1.2 | 0.5 HP |

4. PUMP (39) "from the Equalization Tank to the Rotary Osmosis Filter

| | |
|---|---|
| Nominal diameter of the piping | 2" (58.8 mm) |
| Horizontal length of piping | 10.00 m |
| Vertical length of piping | 3.00 m |
| Total length of piping | 13.00 m |
| Leq. of the Elbows (4) 4 × 1.2 | 3.52 m |
| Leq. of No Return Valve | 5.18 m |
| Leq. of the Globe Valve | 21.3 m |
| Leq. of Increase | 2.5 m |

-continued

| | |
|---|---|
| Leq. of Reduction | 1.3 m |
| Losses due to Friction | 46.8 m |
| Total Length Equivalent | |
| | |
| Total Leq. = 46.8 × 5.4/100 | 2.52 m |
| Total Load = 2.52 + 3 | 5.58 m |
| Volumetric Flow | 14,7204 m³/h |
| | 4,089 l/s |
| Pump Efficiency | 0.85 |
| Conversion Factor | 76 kg-m/s/HP |
| Power of Pump = Ht × Q/76 × 0.85 | |
| | |
| HPb = 5.52 m × 4,089 l/s/76 × 0.85 = | 0.35 HP |
| Electric Motor with FS of 1.2 | 0.5 HP |
| 5. PUMP (42) "from the Rotary Osmosis Filter to the Brine Diffuser" | |
| | |
| Nominal diameter of the piping | 1.5" (38.1 mm) |
| Horizontal length of piping | 8.00 m |
| Vertical length of piping | 3.00 m |
| Total length of piping | 11.00 m |
| Leq. of the Elbows (4) 4 × 0.7 | 2.8 m |
| Leq. of No Return Valve | 3.6 m |
| Leq. of the Globe Valve | 17.9 m |
| Leq. of Increase | 1.8 m |
| Leq. of Reduction | 0.94 m |
| Losses due to Friction | 38.04 m |
| Total Length Equivalent | |
| | |
| Total Leq. = 38.04 × 8.95/100 | 7.04 m |
| Total Load = 7.04 + 3 | 10.04 m |
| Volumetric Flow | 8.8308 m³/h |
| | 2,453 l/s |
| Pump Efficiency | 0.85 |
| Conversion Factor | 76 kg-m/s/HP |
| Power of Pump = Ht × Q/76 × 0.85 | |
| | |
| HPb = 10.04 m × 2.453 l/s/76 × 0.85 = | 0.38 HP |
| Electric Motor with FS of 1.2 | 0.5 HP |
| 6. PUMP (40) "from the Rotary of Osmosis to the Storage Tank" | |
| | |
| Nominal diameter of the piping | 1.5" (203 mm) |
| Horizontal length of piping | 10.00 m |
| Vertical length of piping | 3.00 m |
| Total length of piping | 13.0 m |
| Leq. of the Elbows (4) 4 × 0.7 | 2.8 m |
| Leq. of No Return Valve | 2.8 m |
| Leq. of the Globe Valve | 17.6 m |
| Leq. of increase | 1.8 m |
| Leq. of Reduction | 0.94 m |
| Losses due to Friction | 40.04 m |
| Total Length Equivalent | |
| | |
| Total Leq. = 102.3 × 4.1/100 | 2.92 m |
| Total Load = 4.19 + 3 | 5.92 m |
| Volumetric Flow | 5,886 m³/h |
| | 1,635 l/s |
| Pump Efficiency | 0.85 |
| Conversion Factor | 76 kg-m/s/HP |
| Power of Pump = Ht × Q/76 × 0.85 | |
| | |
| HPb = 5.92 m × 1,635 l/s/76 × 0.85 = | 0.15 HP |
| Electric Motor with FS of 1.2 | 0.25 HP |

Leq = Length Equivalent, (Valsi Manual, 1996).

B. Osmosis Filter Motor

For the design of the osmosis filter the maximum diameter of 1.50 m (1500 mm) was taken as a base of the exterior diameter with 316L type stainless steel plaque with a thickness of 1/8" (3.18 mm) both in the cylinder housing and in the lower conical section and the upper flat top, with a flange of 5 cm to screw it to the body.

A membrane flow of $1.8231 \times 10^{-7}$ m³/s is required. The total number of membranes was 8,976 with which a total flow of $163.64 \times 10^{-5}$ m³/s=5.89 m³/h=141.38 m³/d is obtained per filter, =2120 m³/d per 15 filters.

The arrangement of the modules (16) with 34 membranes in quincunx arrangement as follows: an internal circular row (20) of 82 cartridges (2,788 membranes), an intermediate circular row (21) of 88 cartridges (2,992 membranes), and a third circular row (23) of 94 cartridges (3,196 membranes), giving a total of 264 cartridges (8976 membranes).

To calculate the pump power the mechanical elements were identified that would be submitted to the centrifugal force and the mass was determined and the moment of inertia for each one was determined and the summation of the moments of inertia were multiplied by the acceleration of gravity to determine the total torque required to be multiplied by the RPM required by the process and divided by 7,124 gives the power required by the HP motor. In Table 1 the mechanical elements subject to the centrifugal force is presented.

TABLE 1

Mechanical elements submitted to centrifugal force

| ITEM | QUANTITY | NAME OF THE ITEMS |
|---|---|---|
| 1 | 264 | Hollow PVC cylinder of 6.35 mm |
| 2 | 528 | Conical section O-Ring of 41.28 mm |
| 3 | 8976 | Membrane cylinder of 1 mm |
| 4 | 4 | Disks made of stainless steel plaques 1400 mm |
| 5 | 2 | Solid water cylinder 1360 mm |
| 6 | 2 | Stainless disk cylinder 2, 1400 mm × 6 mm |
| 7 | 264 | Fittings for PVC cylinders 57 mm × 63 mm |
| 8 | 264 | Exterior membrane cartridge 31.75 mm |

Calculation of the Power.

C. HP=(PAR×RPM)/7124

D. HP=(28.426×2000)/7124=7.98

E. KW-H=7.98×0.746=5.95

F. COMMERCIAL POWER=10 HP

G The nominal velocity for a 10 HP motor with a synchronous velocity of 3600 RPM is 3,150 RPM, therefore through the law of Affinity we will have power at the end of:

H. $BHP_1/BHP_2=(RPM_1/RPM2)^3$

I $BHP_1/10=(2000 13500)^3=(0.5714)^3=0.186$

J. $BHP_1=10 \times 0.186=1.86$

K. HP=1.86/0.85=2.2

L. Since the commercial power is 10 HP this power is satisfied. This may be achieved with a frequency variator or with a ratio of the diameters of the pulleys.

Conclusions on the Power Calculations:

The calculations of the pump and motor power for the rotation of the filter are the following:

| The total power of Force (motors) is: | |
|---|---|
| B1 = | 2 HP |
| B2 = | 0.5 HP |
| B3 = | 0.5 HP |
| B4 = | 0.5 HP |
| B5 = | 0.5 HP |
| B6 = | 0.25 HP |
| Mf = | 10 HP |
| | |
| Total = | 14.25 HP |
| = | 10.63 kw |
| = | 10.63 kw-h |

Considerations for the calculation of the energy unit consumption, based on the production of potable water:

Production of water permeated by osmosis through filter=5.886 m³/h

Energy consumption per filter=9.1205 kw-h

NOTE: the difference between real and nominal power is that commercially there are no synchronous and nominal speed 2000 RPM engines (at full load). Then the law of affinity is applied by means of a speed (or frequency) variator to make the adjustments to the speed required.

Yield kw-h/m³=9.12051 5.886=1.5489 kw-h/m³

Production of water permeated by osmosis per filter=141.38 m³/h

Production of water permeated by osmosis per 15 filters=2120 m³/h

Energy consumption per 15 filters=136.81 kw-h

Energy consumption per day=3283.38

Yield kw-h/h/m³/h=3283.38/2120=1,548 kw-h/m³

Regarding the results obtained for this example, related to energy unit consumption: 1.548 Kwh/m³ of treated water makes the proposal coming from this invention really worth considering.

Additionally, this invention proposes the use of VCRs (remote control displays), through sensors placed strategically, in the sites susceptible to any change in the system, and thus ensure efficient maintenance, and repositioning of the membranes, modules, or any other accessory that comprises part of the technological and productive unit.

The resulting unit production cost is lower than the costs of other plants with those that were compared with this process, due to the low costs for maintenance and cleaning of the membranes, which represents substantial savings in chemicals used for washing with no need to stop the production, repositioning of the membranes, recovery of energy due to the use of system hydrodynamics, the membrane arrangement means greater flow of the permeate and the investment is relatively low; it does not require much equipment, the organization of an efficient personnel management The manufacture of the membrane selected begins with an aromatic polyamide as its first layer, followed by a layer of polyestersulfone and a support layer of polyester; applying the material Kevlar 49 in position 1 and 4 on the aromatic chain structure to increase the structure and resistance of the membrane.

For centrifugal reverse osmosis, proposed by this invention, hollow fiber membranes are used, manufactured with the materials mentioned, and that have a boron retention of 93% to 98%, and duly arranged spirally, to bring about the formation of the Dean vortices. According the information from DOW, their spiral membranes retain 94% of boron retention.

The geometry of the membrane is helicoidal or spiral, which makes the formation of the Dean vortices possible and the arrangement of the membranes is in the form of a quincunx, around a pole-axis, to give it greater consistency and a more solid structure.

To achieve the above, the necessary calculations were made, to obtain 5.5 MPa that is required and was given as a result, so the rotor must have a speed of 2,000 RPM, and a motor with 10 HP of power.

To make more efficient use of the spaces in the filter, 3 rows of membrane modules are arranged, for a total of 264 modules, and an arrangement per module of 34 membranes is in the form of a quincunx, resulting in a total of 8,976 membranes in the filter.

The critical points of manufacture were analyzed; among them, the Kalsi seals, which are self-lubricating and operate hermetically, one fixed part and another that is rotary with the filter, and they are designed to operate at high pressures and speeds, they are elastomers of a single piece and hydrodynamic principles are used which create a thin layer of lubricant between the seal (hermetic gasket) and the shaft; largely minimizing, the effects of wear by friction. Lubrication lengthens the operational life of the seal and the rotation shaft, reducing torsional force, they are designed for the combination of high speeds with high levels of pressure, reliable and consistent performance in abrasive environments; resistance to impact and vibration; they work up to 352 kg/cm2 (345 bar) and pressure values for speeds up to 1340 Kg/cm2×m/s (1310 bars×m/s). They also include the disks containing the feed water and reject water, since the permeated water is obtained at the top of membranes and the treated water flows by gravity into the filter housing. The housing remains static, to save energy consumption.

The materials are AISI 316 stainless steel, Schedule 80 PVC, elastomers and urethane, were the most used.

The total power required for the rotation of the filter and for the process is 14.25 HP.

In the calculations performed an energy consumption of 1.548 kWh/m³ was obtained.

There are many combinations that could be made and tested, on the number of membrane modules and the number of membranes per module, and to calculate power and energy consumption, as well as system efficiency, and to test whether the increase in the filter weight and radii, make it possible, with a little energy, to obtain 5.5 MPa, which is required for reverse osmosis.

The pre-treatments and post-treatments, proposed, could be applied in other forms, using new reagents, that are more environmentally friendly, equipment that could result more economical, but that maintain the same quality of permeate water, as proposed by the WHO.

Having sufficiently described the invention, we feel that it is an innovation and therefore, we claim the content of the following Clauses as our exclusive property:

1. A process for sea water desalination, wherein the sea water containing salt is collected from a sea via an open intake and transported via a pump to an elevated tank, passing the sea water through a sand filter to remove suspended solids from the sea water, the sea water is then pumped through a cartridge filter to form a prefiltered sea water, the prefiltered sea water is then pumped into an equalization tank from which the prefiltered sea water is pumped at a constant speed through a rotary reverse osmosis filter, the filter defining a plurality of membranes configured to receive the prefiltered sea water containing salt therein and undergo centrifugation as a motor rotates the rotary reverse osmosis filter such that the sea water containing salt therein is passed through the plurality of membranes and undergoes reverse osmosis while the motor rotates the rotary reverse osmosis filter, from which a first fluid and a second fluid are released, the first fluid being a desalinated treated water received from a top end of the plurality of membranes, which flows into a basin located below the rotary reverse osmosis filter and is then transported to a post-treatment tank, and the second fluid being a concentrated solution that is expelled; and wherein the rotary reverse osmosis filter generates Dean vortices, within the prefiltered sea water contained within the plurality of membranes while the motor rotates the rotary reverse osmosis filter, such that the Dean vortices promote self-cleaning of a plurality of pores disposed in the plurality of membranes and increase fluid pressure on an inner surface of the plurality of membranes.

2. A process such as that claimed in claim 1, wherein an energy consumption of the process is lower than 1.7 Kwh/m³ of treated water.

3. A process such as that claimed in claim 1, wherein an energy consumption of the process is within the range of 1.548 Kwh/m³ of treated water to 1.7 Kwh/m³ of treated water.

4. A process for sea water desalination, comprising the steps of:
- collecting seawater at an intake;
- pumping the seawater to an elevated storage tank;
- passing the seawater through a sand filter to remove suspended solids from the seawater;
- passing the seawater through a cartridge filter to form a prefiltered seawater;
- pumping the prefiltered seawater into a storage tank for equalization;
- pumping a volume of the prefiltered seawater from the storage tank to an intake of a filter at a constant speed, wherein the filter is a centrifuge reverse osmosis filter for seawater desalination, comprising:
  - a plurality of hollow fiber membrane modules arranged in concentric rows about the periphery of a disk that is rotated by a motor;
  - each of the plurality of hollow fiber membrane modules comprising
    - a central support pipe,
    - a plurality of hollow fiber membranes disposed about the central support pipe, wherein the plurality of hollow fiber membranes are arranged in a quincunx configuration in cross-section, and
    - an external cylinder disposed about the plurality of hollow fiber membranes;
- filling the plurality of hollow fiber membrane modules with the prefiltered seawater from a bottom end of the plurality of hollow fiber membrane modules;
- rotating the filter to form Dean votices within the prefiltered seawater contained within the plurality of hollow fiber membrane modules, such that the Dean vortices promote self-cleaning of a plurality of pores disposed in the hollow fiber membranes and increase fluid pressure on an inner surface of the hollow fiber membranes;
- desalinating a first portion of the volume of the prefiltered seawater by passing the first portion of the volume of the prefiltered seawater through the hollow fiber membrane modules to form treated water;
- discharging the treated water received from a top end of the plurality of hollow fiber membrane modules to a post-treatment tank; and
- discharging a second portion of the volume of the prefiltered seawater defining a concentrated solution to a brine diffuser.

5. The process of claim 4, wherein the plurality of hollow fiber membrane modules are arranged in three concentric rows about the periphery of the disk that is rotated by the motor.

6. The process of claim 4, wherein the treated water received from the top end of the plurality of hollow fiber membrane modules to the post-treatment tank is desalinated water.

* * * * *

UNITED STATES PATENT AND TRADEMARK OFFICE
CERTIFICATE OF CORRECTION

PATENT NO. : 9,573,098 B2
APPLICATION NO. : 13/984441
DATED : February 21, 2017
INVENTOR(S) : Jorge Antonio de la Cruz Lechuga Andrade et al.

It is certified that error appears in the above-identified patent and that said Letters Patent is hereby corrected as shown below:

On the Title Page

(75) Inventors: Please correct the first inventor's name to read:
-- Jorge Antonio de la Cruz Lechuga Andrade --.

Signed and Sealed this
Sixteenth Day of May, 2017

Michelle K. Lee
*Director of the United States Patent and Trademark Office*